(12) United States Patent
Determan

(10) Patent No.: US 6,622,105 B2
(45) Date of Patent: Sep. 16, 2003

(54) DYNAMIC CORRELATION EXTENSION FOR A SELF-BALANCING ROTATABLE APPARATUS

(75) Inventor: Gary Edward Determan, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 85 days.

(21) Appl. No.: 09/951,932

(22) Filed: Sep. 10, 2001

(65) Prior Publication Data

US 2003/0065468 A1 Apr. 3, 2003

(51) Int. Cl.[7] ............... G01F 1/12; G01G 23/01; G01C 19/00
(52) U.S. Cl. ............. 702/105; 702/100; 702/102; 702/104; 73/458; 73/468
(58) Field of Search ................. 702/104, 102, 702/105, 100; 73/458, 468; 68/23.1, 23.2, 24; 700/302, 305

(56) References Cited

U.S. PATENT DOCUMENTS

| | | | |
|---|---|---|---|
| 3,983,035 A | 9/1976 | Arkeveld et al. | 210/138 |
| 4,000,658 A | 1/1977 | Schmidt | 73/490 |
| 4,157,781 A | 6/1979 | Maruyama | 233/23 A |
| 4,322,641 A | 3/1982 | Packard | 307/521 |
| 4,694,156 A | 9/1987 | Swanberg | 250/214 |
| 4,991,247 A | 2/1991 | Castwall et al. | 8/158 |
| 5,150,314 A | 9/1992 | Garratt et al. | 364/571.02 |
| 5,280,660 A | 1/1994 | Pellerin et al. | 8/158 |
| 5,325,677 A | 7/1994 | Payne et al. | 68/12.04 |
| 5,490,436 A | 2/1996 | Coyne et al. | 74/573 |
| 5,561,993 A | 10/1996 | Elgersma et al. | 68/23.2 |

(List continued on next page.)

FOREIGN PATENT DOCUMENTS

EP          1 036 875 A2      9/2000    ........... D06F/39/08

OTHER PUBLICATIONS

PCT, Notification of Transmittal of International Search Report, Jan. 28, 2003 International Application No. PCT/US 02/28648 (Referencing Elgersma et al., U.S. Patent No. 5,561,993).

*Primary Examiner*—John Barlow
*Assistant Examiner*—Meagan S. Walling
(74) *Attorney, Agent, or Firm*—Kris T. Fredrick; Kermit D. Lopez; Luis Ortez

(57) ABSTRACT

A method and system for detecting acceleration and force data associated with a rotating device or rotating system is disclosed, which includes a sine table and a cosine table that may be created based on a particular number of measured data points per revolution of the rotating device or rotating system. Data contained within the sine and cosine tables are then dynamically correlated to obtain acceleration and force data associated with the rotating device or rotating system, wherein dynamically correlated data are thereby utilized to determine a required correction necessary to place the rotating device or rotating system in a balanced state. An error calculated based on a sample size and the number of samples obtained since a last index pulse can be utilized to compute the validity of the data. An index may be associated with the sine table and an additional index associated with the cosine table, wherein each of the indexes is formulated based on an angle per index based on the particular number of measured data points divided by 360 degrees. At least one sine element and at least one cosine element may be respectively calculated for the index associated with the sine table and the index associated with the cosine table. The sine and cosine tables can be combined into one table to thereby reduce memory required to dynamically correlate the data contained within the sine and cosine tables.

17 Claims, 9 Drawing Sheets

U.S. PATENT DOCUMENTS

| | | | |
|---|---|---|---|
| 5,582,040 A | 12/1996 | Khan | 68/23.2 |
| 5,692,313 A | 12/1997 | Ikeda et al. | 34/58 |
| 5,715,731 A | 2/1998 | Koch | 74/573 |
| 5,729,025 A | 3/1998 | Erickson et al. | 250/574 |
| 5,731,868 A | 3/1998 | Okey et al. | 356/73 |
| 5,757,481 A | 5/1998 | O'Brien et al. | 356/243 |
| 5,761,932 A | 6/1998 | Kim | 68/23.2 |
| 5,761,933 A | 6/1998 | Kim et al. | 68/23.2 |
| 5,765,402 A | 6/1998 | Ikeda et al. | 68/12.06 |
| 5,800,628 A | 9/1998 | Erickson et al. | 134/18 |
| 5,850,748 A | 12/1998 | Kim et al. | 68/23.2 |
| 5,862,553 A | 1/1999 | Harberl et al. | 8/159 |
| 5,870,907 A | 2/1999 | Cho | 68/23.1 |
| 5,893,280 A | 4/1999 | Honda et al. | 68/12.06 |
| 5,913,951 A | 6/1999 | Herr et al. | 8/158 |
| 5,921,148 A | 7/1999 | Howell | 74/573 |
| 5,923,433 A | 7/1999 | Giuffre et al. | 356/440 |
| 5,957,144 A | 9/1999 | Neff et al. | 134/56 D |
| 5,960,804 A | 10/1999 | Cooper et al. | 134/56 D |
| 5,979,236 A | 11/1999 | Hong et al. | 73/458 |
| 6,007,640 A | 12/1999 | Neff et al. | 134/18 |
| 6,029,300 A | 2/2000 | Kawaguchi et al. | 8/159 |
| 6,047,428 A | 4/2000 | Min | 8/159 |
| 6,077,423 A | 6/2000 | Roy et al. | 210/121 |
| 6,082,151 A | 7/2000 | Wierzba et al. | 68/23.2 |
| 6,129,768 A | 10/2000 | Johnson et al. | 8/159 |
| 6,130,928 A | 10/2000 | Jamzadeh et al. | 377/23 |
| 6,144,447 A | 11/2000 | Ohman et al. | 356/246 |
| 6,148,647 A | 11/2000 | Kabeya et al. | 68/140 |
| 6,159,384 A | 12/2000 | Roberts et al. | 210/741 |
| 6,184,518 B1 * | 2/2001 | Klein | 250/233 |
| 6,477,867 B1 * | 11/2002 | Collecutt et al. | 68/12.06 |

* cited by examiner

DYNAMIC CORRELATION EXTENSION FOR A SELF-BALANCING ROTATABLE APPARATUS

RELATED APPLICATIONS

This application is related to co-pending and co-owned patent applications entitled: Method and Apparatus for Reducing Microprocessor Speed Requirements in Data Acquisition Applications,' Honeywell Docket No. M10-01121, U.S. Ser. No. 09/792,996, filed on Feb. 26, 2001; 'Method and System for Detecting Fluid Injection from Stationary to Rotating Members,' Honeywell Docket No. M10-01128, U.S. Ser. No. 09/951,790, filed on Sep. 10, 2001; 'Simultaneous Injection Method and System for a Self-Balancing Rotatable Apparatus,' Honeywell Docket H16-26312, U.S. Ser. No. 09/896,763, filed on Jun. 29, 2001; 'Energy-Based Thresholds Applied to Dynamic Balancing,' Honeywell Docket No. H16-02079, U.S. Ser. No. 09/951,798, filed on Sep. 10, 2001; 'Continuous Flow Method and System for Placement of Balancing Fluid on a Rotating Device Requiring Dynamic Balancing', Honeywell Docket H16-01112, U.S. Ser. No. 10/001,006, filed on Nov. 15, 2001; 'Dynamic Balancing Application Mass Placement', Honeywell Docket H16-01117, U.S. Ser. No. 10/001,090, filed on Nov. 15, 2001; 'Fixed-Bandwidth Correlation Window Method and System for a Self-Balancing Rotatable Apparatus,' Honeywell Docket No. M10-02075, U.S. Ser. No. 09/999,594, filed on Nov. 15, 2001; 'Supervisory Method and System for Improved Control Model Updates Applied to Dynamic Balancing,' Honeywell Docket No. H16-02076, U.S. Ser. No. 10/011,218, filed on Nov. 15, 2001; 'Data Manipulation Method and System for a Self-Balancing Rotatable Apparatus,' Honeywell Docket No. H16-02078, U.S. Ser. No. 10/000,882, filed on Nov. 15, 2001; 'Resonance Identification Extension for a Self-Balancing Rotatable Apparatus,' Honeywell Docket No. H16-02080, U.S. Ser. No. 10/001,098, filed on Nov. 15, 2001; 'Method and System for Mechanizing Simultaneous Multi-Actuator Actions Applied to Dynamic Balancing,' Honeywell Docket No. H16-26313, U.S. Ser. No. 10/000, 255, filed on Nov. 15, 2001.

TECHNICAL FIELD

The present invention relates generally to rotatable members that are able to achieve balanced conditions throughout a range of rotational speeds. The present invention also relates to methods and systems for dynamically balancing rotatable members through the continual determination of out-of-balance forces and motion to thereby take corresponding counter balancing action. The present invention additionally relates to methods and systems in which inertial masses are actively placed within a rotating body in order to cancel rotational imbalances associated with the rotating body thereon. The present invention additionally relates to timely methods and system that extract measured signal components indicative of the balance condition of the rotating system and used to build the rotating system control model as well as influence the course of dynamic balance control.

BACKGROUND OF THE INVENTION

Mass unbalance in rotating machinery leads to machine vibrations that are synchronous with the rotational speed. These vibrations can lead to excessive wear and to unacceptable levels of noise. Typical imbalances in large rotating machines are on the order of one inch-pound.

It is a common practice to balance a rotatable body by adjusting a distribution of moveable, inertial masses attached to the body. Once certain types of bodies have been balanced in this fashion, they will generally remain in balance only for a limited range of rotational velocities. A tire, for instance, can be balanced once by applying weights to it. This balanced condition will remain until the tire hits a very big bump or the weights are removed. A centrifuge for fluid extraction, however, can change the amount of balance as more fluid is extracted.

Many machines are also configured as free standing spring mass systems in which different components thereof pass through resonance ranges until the machine is out of balance. Additionally, such machines may include a rotating body flexibly located at the end of a shaft rather than fixed to the shaft as in the case of a tire. Thus, moments about a bearing shaft may also be created merely by the weight of the shaft. A flexible shaft rotating at speeds above half of its first critical speed can generally assume significant deformations, which add to the imbalance. This often poses problems in the operation of large turbines and turbo generators.

Machines of this kind usually operate above their first critical speed. As a consequence, machines that are initially balanced at relatively low speeds may tend to vibrate excessively as they approach full operating speed. Additionally, if one balances to an acceptable level rather than to a perfect condition (which can be difficult to measure), the small remaining out of balance will progressively apply force as the speed increases. This increase in force is generally due to the fact that $F\alpha r\omega^2$ (note that F represents the "out-of-balance" force, r represents the radius of the rotating body and $\omega$ represents its rotational speed).

The mass unbalance distributed along the length of a rotating body may give rise to a rotating force vector at each of the bearings that support the body. In general, the force vectors at respective bearings are not in phase. At each bearing, the rotating force vector may be opposed by a rotating reaction force, which can be transmitted to the bearing supports as noise and vibration.

The purpose of active, dynamic balancing is to shift an inertial mass to the appropriate radial eccentricity and angular position for canceling the net mass unbalance. At the appropriate radial and angular distribution, the inertial mass can generate a rotating centrifugal force vector equal in magnitude and phase to the reaction force referred to above.

Many different types of balancing schemes are known to those skilled in the art. When rotatable objects are not in perfect balance, nonsymmetrical mass distribution creates out-of-balance forces because of the centrifugal forces that result from rotation of the object. Although rotatable objects find use in many different applications, one particular application is a rotating drum of a washing machine.

U.S. Pat. No. 5,561,993, which issued to Elgersma et al. on Oct. 22, 1996 (assigned to the owner of the present application) and is incorporated herein by reference, discloses a self-balancing rotatable apparatus. Elgersma et al. disclosed a method and system for measuring forces and motion via accelerations at various locations in a system. The forces and moments were balanced through the use of a matrix manipulation technique for determining appropriate counterbalance forces located at two axial positions of the rotatable member. The method and system described in Elgersma et al. accounted for possible accelerations of a machine, such as a washing machine, which could not otherwise be accomplished if the motion of the machine were not measured. Such a method and system was operable in association with machines not rigidly attached to immovable objects, such as concrete floors. The algorithm disclosed by Elgersma et al. permits counterbalance forces to be calculated even though a washing machine is located on a moveable floor structure combined with carpet padding and carpets between the washing machine and a rigid support structure.

U.S. Pat. No. 5,561,993 thus described a dynamic balance control algorithm for balancing a centrifuge for fluid extraction. To accomplish such balance control, sensor measurement data may be utilized to assess the immediate balance conditions and determine the course of balance control. Related sensor responses to balance control actions may be modeled to determine the specific future control actions. In making sensor measurements, relevant acceleration and force data may be obtained from sensors on a rotating device with a narrow band pass filtering function that is tunable in real time to the speed of rotation. The band pass function can be accomplished through correlation of the sensor signal with a sinusoid referenced to the position of the rotating device.

By obtaining at least one known position of the rotating device, data can be measured and calculated with respect to that position. Creating two summations correlates measured points: an X summation and a Y summation. The X summation is generally one revolution of data points multiplied by a cosine reference term with respect to the position of the rotating device. The Y summation is generally one revolution of data points multiplied by a sine reference term with respect to the position of the rotating device. For a reasonable filtered or correlated result, two or three revolutions of data can be collected utilizing a direct memory access. A correlation can be then performed on the complete data set. This approach takes a great deal of time, both in process and delay time, while waiting for the device to rotate. This time can be critical because the balance condition is constantly changing. Additionally, variation in rotational speed can impact correlated results, yet a check is not available to validate the correlated result.

Thus, there exists a need for a method and system for implementing a correlation filter function in a manner that reduces computation and process delay times, thereby providing a quality measure of the correlated result. The present invention described herein overcomes these obstacles through the use of specially-indexed sinusoidal reference tables representing a fixed number of data points per signal period, independent of rotational speed, and through the use of quality parameters based on actual versus expected data samples per signal period.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

In accordance with addressing the shortcomings of the prior art, it is one aspect of the present invention to provide methods and systems in which rotatable members can achieve balanced conditions throughout a range of rotational speeds.

It is another aspect of the present invention to provide methods and systems for dynamically balancing rotatable members through the continual determination of out-of-balance forces and motion to thereby take corresponding counter balancing action.

It is still another aspect of the present invention to provide dynamic correlation extensions and improvements for a self-balancing rotatable apparatus.

In accordance with various aspects of the present invention, methods and systems are discussed herein for dynamically balancing a rotating system utilizing filtered sensor signals, wherein the rotating system contains sensors therein. A sine table and a cosine table is created based on a particular number of measured data points per revolution of the rotating device and referenced to the rotational position. Data contained within the sine and cosine tables are then correlated in real time with sensor signals to obtain sensor measurements associated with a balance condition of the rotating device. The dynamically correlated data can be thereby utilized to build a rotating system control model as well as influence the course of dynamic balance control. An error calculation based on a sample size and the number of samples obtained since a last index pulse can be utilized to compute the validity of the data. An index can be associated with the reference sine table and an additional index associated with the cosine reference table. Each of the indexes can be formulated based on an angle per index, which in turn is based on a particular number of measured data points desired per signal period divided by 360 degrees. At least one sine element and at least one cosine element are respectively calculated for an index associated with the sine table and the index associated with the cosine table. The sine and cosine tables can be combined into one table to thereby reduce memory required to dynamically correlate the signal data with the data contained within the sine and cosine tables.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate embodiments of the present invention and are not intended to limit the scope of the invention.

The present invention is generally an improvement of the invention disclosed in U.S. Pat. No. 5,561,993. The basic configuration and concepts explained in U.S. Pat. No. 5,561,993 are discussed herein but in no way limit the scope of the invention described and claimed herein. Features revealed in U.S. Pat. No. 5,561,993 are presented herein for illustrative purposes only in order to explain the foundation from which the present invention was derived. Those skilled in the art can appreciate that such features, including figures, text, descriptions, equations and tables thereof, do not limit the scope of the present invention, as described and claimed herein.

Figure 1:
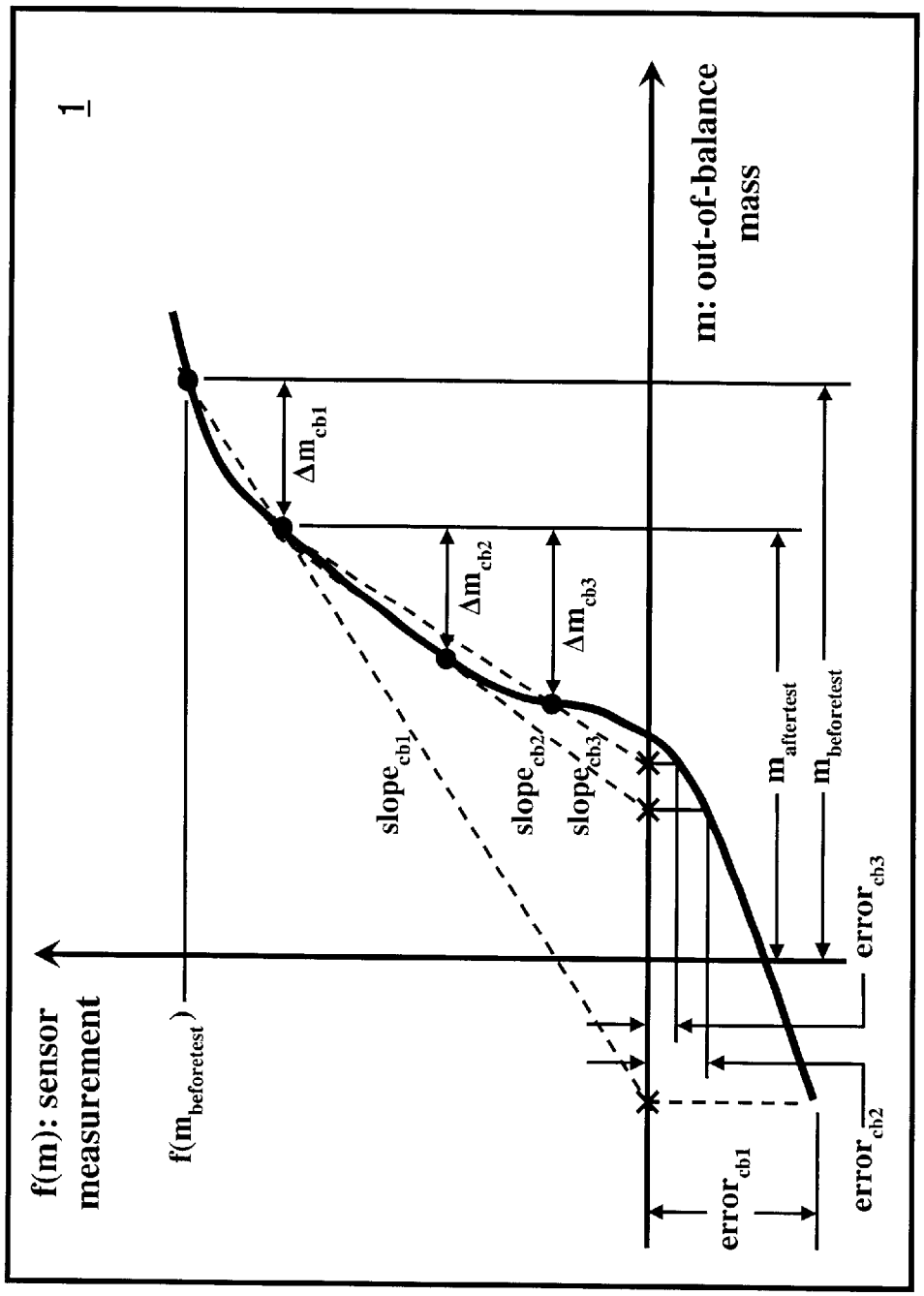
FIG. 1 depicts a plot of a non-linear system, in accordance with preferred embodiments of the present invention.

FIG. 1 depicts a plot of a non-linear system 1, in accordance with preferred embodiments of the present invention. Given a very simple (e.g., one-dimensional) non-linear system, such as non-linear system 1, the system can be balanced when the sensor measurement, f(m), is driven to zero. The objective of such a system is to find a value for a counterbalance $\Delta m$, such that the sensor measurement, f(m), is driven to zero, i.e. f(m)=0. Utilizing a Taylor's series expansion in the vicinity of the anticipated operating range and neglecting second order and higher terms, results in a linear model: straight line of the form y=b+mx. The system can be perturbed, $\Delta m_{cb}$, to determine the slope of the linear model, and the counterbalance $\Delta m$ for driving f(m) to zero can be estimated. The linear model can be written to reflect the example illustrated in FIG. 1, where several possible line estimates are shown; equation 1 expresses this relationship.

$$f(m_{next}) \approx f(m_{aftertest}) + \left(\frac{\partial f(m)}{\partial m}\right) \cdot (m_{next} - m_{aftertest}) \quad (1)$$

Those skilled in the art can appreciate that $f(m_{next})$ represents the desired sensor measurement. In addition, $f(m_{aftertest})$ can represent the sensor measurement after placement of a test mass or a prior balance-control action. The variable m generally represents the out of balance in the system. For example, the variable $m_{aftertest}$ generally represents the out-of-balance mass after placement of a test weight ($\Delta m_{test}$), and the change in m, (i.e., $\Delta m = m_{next} - m_{aftertest}$), is the counterbalance mass required to achieve a desired sensor measurement, ($f(m_{next})=0$). The control action involves moving in the direction of the estimated counterbalance and updating the system model and the required counterbalance estimate as control progresses. Those skilled in the art can appreciate that this control implementation of equation 1 represents the well-known Newton Raphson iteration method.

Because the objective is to find $f(m_{next})=0$, the general form of the equation reduces to:

$$m_{next} = m_{aftertest} - \left[\frac{\partial f(m)}{\partial m}\right]^{-1} \cdot f(m_{aftertest}) \quad (2)$$

where $m_{next}$ is the solution or system out of balance needed to make $f(m_{next})=0$ or drive the sensor measurement to zero. Thus, the estimated mass change $m_{cb}$ generally required for counterbalance action is illustrated in equation 3.

$$m_{cb} = m_{next} - m_{aftertest} = -f(m_{aftertest}) \bigg/ \left(\frac{\partial f}{\partial m}(m_{aftertest})\right) \quad (3)$$

The partial derivative, or slope of the sensor function, can be found by perturbing the system. This may be generally illustrated in equation 4, which represents the change in sensor measurements due to placement of the test weight ($\Delta m_{test} = m_{aftertest} - m_{beforetest}$).

$$\frac{\partial f}{\partial m}(m_{aftertest}) = \frac{f(m_{aftertest}) - f(m_{beforetest})}{m_{aftertest} - m_{beforetest}} \quad (4)$$

Combining equations 3 and 4 can result in a generalized form shown in equation 5 below, which is generally expressed in an expanded notion of multiple inputs and outputs.

$$[f(m_{aftertest})] = -\left[\frac{\partial f(m)}{\partial m}\right] \cdot [\Delta m_{solution}] \quad (5)$$

Regarding the linear models and associated slope calculation in FIG. 1, it can be appreciated that a change in mass may result in a change in the system, and the system itself may be nonlinear; thus, the linear model utilized to determine the next counterbalance may contain one or more significant errors. Therefore, when applying the Newton Raphson iteration to a process, certain requirements should be followed. First, the initial approximation should be sufficiently accurate to result in subsequent operation near a desired solution and the measurement f(m) should be smooth, nearly linear and single-valued in the vicinity of the anticipated operation. Additionally, because higher derivatives of force are neglected in this type of approximation, the higher derivatives should be small so as to avoid convergence problems.

Lastly, in applications of the Newton Raphson iteration, only one solution of mass m should exist for the sensor measurement being equal to zero. This means that there is only one root. Even following the above requirements, system noise may be a concern. In the hypothetical illustration of FIG. 2, a larger initial test weight, which changes the system to point C, is preferable to one that changes it to point B. This can be evidenced by comparing the slopes of lines 22, 24 and 26, which result from the various test mass perturbations depicted in FIG. 2. The difference between the before and after test measurement should be large enough to obtain a good approximation of the slope of the function and ensure that the resulting change in the measurement dominates the changes due to system noise.

Figure 3:
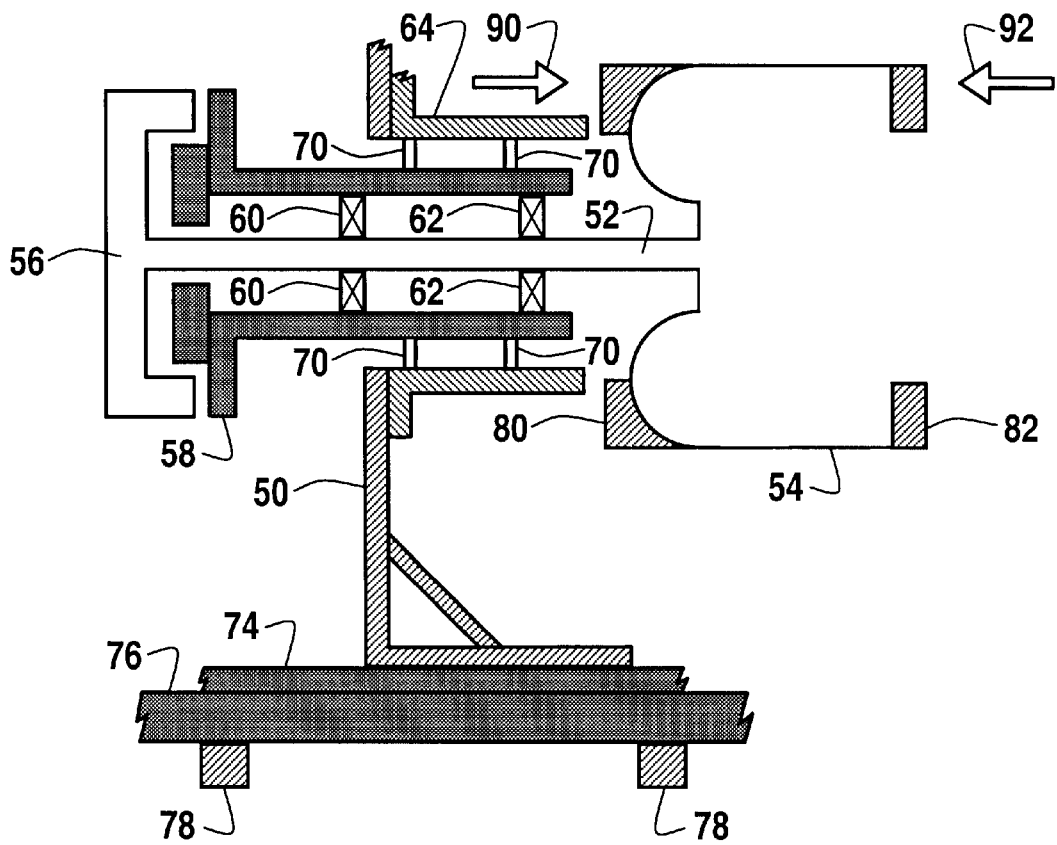
FIG. 3 depicts a schematic representation of a washing machine, which may be adapted for use in association with the present invention.

FIG. 3 depicts a schematic representation of a washing machine used to illustrate the concepts in U.S. Pat. No. 5,561,993, which may be adapted for use in association with the present invention. Those skilled in the art can appreciate that the present invention may be implemented within a rotating device or rotating system, such as, for example, a washing machine. Those skilled in the art can further appreciate, however, that other types of rotatable systems or rotating devices may be utilized in accordance with the present invention. Note that as utilized herein, the terms "rotating system," "rotating device," "rotating apparatus," "rotatable apparatus," "rotatable system," or "rotatable device" may be utilized interchangeably. Note that one type of a rotating system or rotating device that may be utilized in accordance with the methods and systems of the present invention is a washing appliance, such as, for example, a washing machine, dishwasher, or circuit board washing device. Such washing appliances are of course, not limiting features of the present invention. The present invention may apply to a variety of different washing appliances. The basic mechanism of dynamic balancing involves counter balancing the out-of-balance load by injecting water into a plurality of cups placed at front and back axial planes, identified by reference numbers 80 and 82 in FIG. 3, of the rotatable drum. Although the test mass or "mass" utilized to describe a preferred embodiment of the present invention may be a fluid mass, those skilled in the art can appreciate that such a mass may be comprised of many different materials, and the invention is not limited to fluid-based injection for placing mass.

FIG. 3 thus schematically illustrates a washing machine comprising a frame 50, a shaft 52 and a rotatable drum 54. Shaft 52 is attached to rotatable drum 54. These two components can be attached to a rotor or pulley 56 of a motor drive. Frame 50 provides a support for a bearing housing 58 in which bearings, 60 and 62, are generally supported. A housing mount 64 supports bearing housing 58. A plurality of sensors identified by the reference numeral 70 is illustrated at a location between housing mount 64 and bearing housing 58 in FIG. 3. These sensors are described in greater detail below. Beneath frame 50 are generally shown a carpet and pad 74, a plywood support member 76 and a plurality of joists 78. The representation shown in FIG. 3 illustrates a typical application of a horizontal washing machine in a residential housing application. Those skilled in the art can appreciate that FIG. 3 is presented for illustrative purposes only and that a variety of washing machine configurations and other rotating devices not illustrated herein may be utilized to implement varying embodiments of the present invention.

With continued reference to FIG. 3, the rotatable drum 54 is shown having a plurality of schematically illustrated back cups 80 and front cups 82. Both the front and back cups are disposed at axial ends of the rotatable drum 54 and, although not shown in FIG. 3, both the front and back cups can comprise a plurality of cups dispersed around the periphery of the drum. A quantity of liquid such as water can be injected into the cups from a stationary control valve supplied with water, such as those identified by reference numerals 90 and 92.

Figure 4:
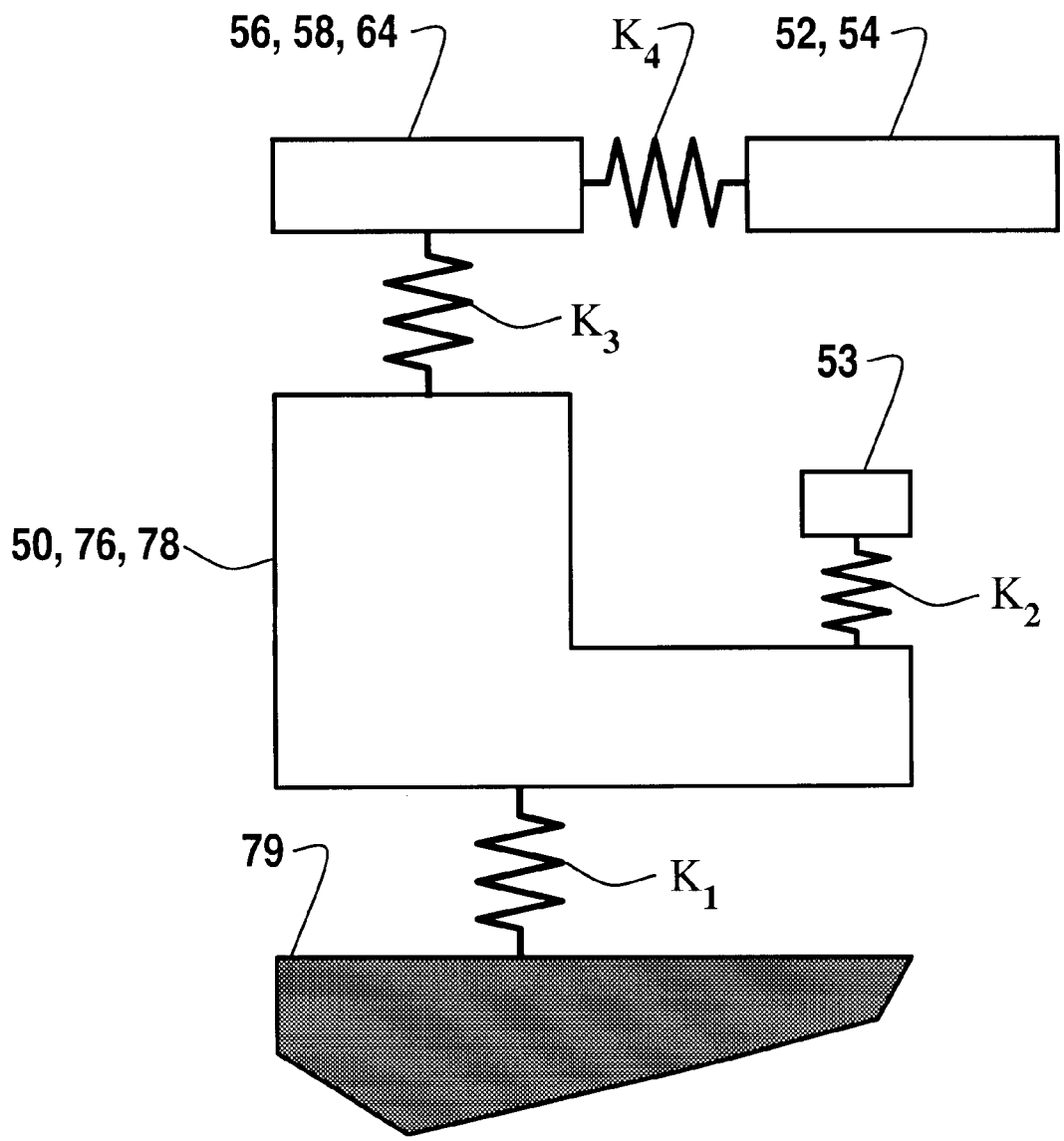
FIG. 4 illustrates a spring and mass illustration depicting the manner in which a nonrigid washing machine can behave if mounted on nonrigid structures.

FIG. 4 illustrates a simplified schematic mass and spring representation of a washing machine such as that shown in FIG. 3. Some balancing systems assume that the machine is attached rigidly to an immovable object or footing, such as a concrete floor. In most practical residential housing applications, however, the machine is not rigidly attached to an immovable object and, instead, is associated with a plurality of flexible members. For example, FIG. 4 depicts a schematic representation of a type of arrangement usually encountered in washing machine applications. FIG. 4 thus illustrates a spring and mass illustration depicting the manner in which a nonrigid washing machine can behave if mounted on nonrigid structures.

The behavior of frame 50 in relation to footing 79 can be described as a spring representing frame 50 and floor 76 and having a spring constant K1. The relationship between a tub 53 (not shown in FIG. 3) surrounding the rotatable drum 54 and frame 50 can be described by a spring constant K2. A spring constant K3 represents the relationship between bearing housing 58 and housing mount 64 and frame 50 in FIG. 3. Lastly, FIG. 4 illustrates a spring constant K4 that represents the bending of shaft 52 along with rotatable members 54 and 56.

Although only represented by boxes in FIG. 4, the schematic illustration depicts a multitude of mass-spring subsystems defining the relationships between major components of the overall system. One purpose of the FIG. 4 illustration is to demonstrate that the relationships between these components are not rigid and, as a result, permit motion, resulting in accelerations, to occur in response to forces exerted on the various components. Therefore, if the system is not rigid and only forces are measured by the sensors 70 shown in FIG. 3, accurate counterbalance determinations would be extremely difficult, if not impossible, to make.

Figure 2:
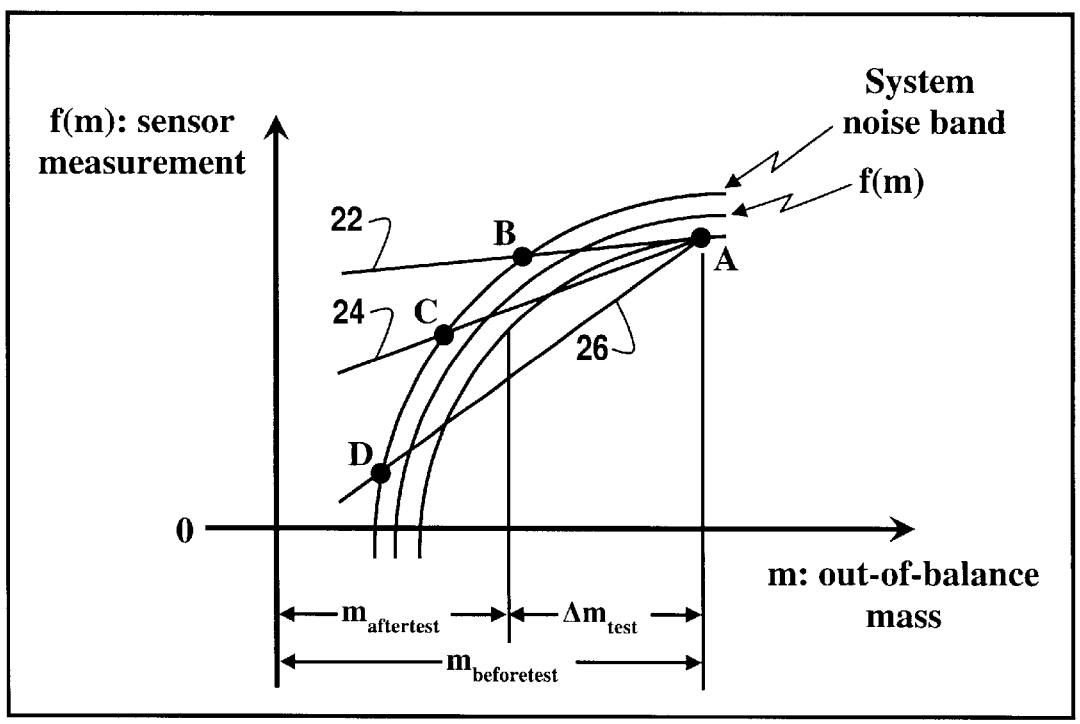
FIG. 2 illustrates a graphical representation of a nonlinear system and the effect of system noise with which the present invention must be concerned.
Figure 5:
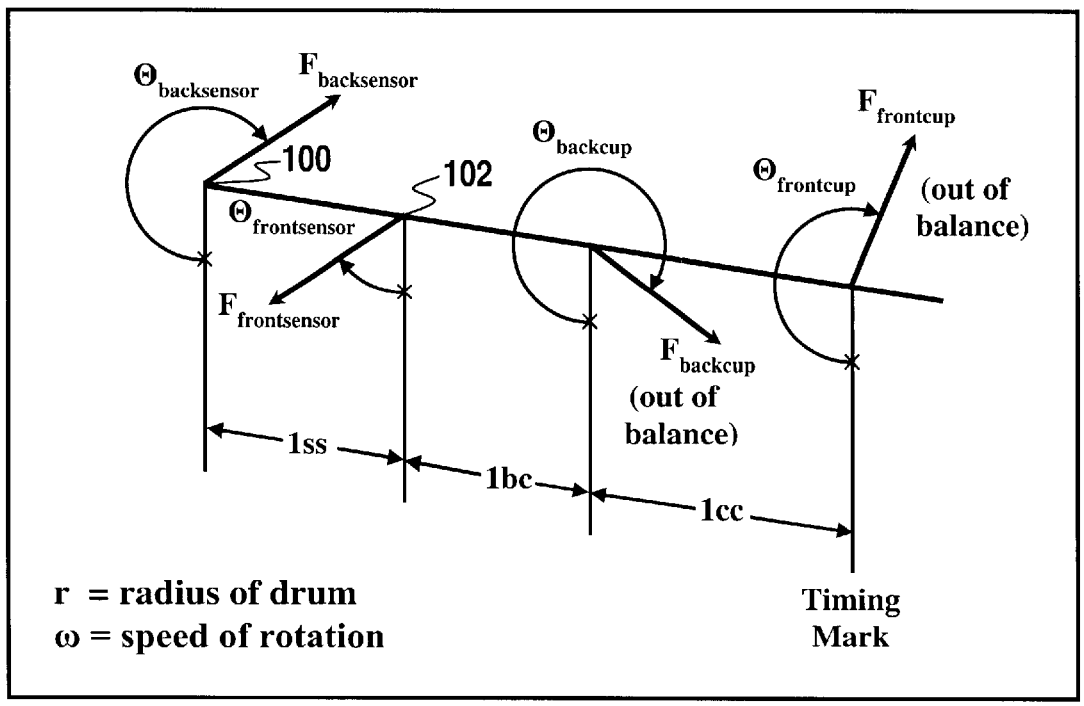
FIG. 5 depicts a three dimensional schematic representation of the forces and critical lengths along an axis of rotation, which has been extended along a length of the shaft and through a length of the drum.

FIG. 5 illustrates a three-dimensional schematic representation of the forces and critical lengths along the axis of rotation, which has been extended along the length of the shaft and through the length of the drum. Force sensors may be mounted to measure the force transmitted between housing mount 64 and bearing housing 58, as illustrated in FIG. 2. The basic concept of dynamic balancing stipulates that vector forces at the front and back cups may represent an out-of-balance condition. Referring to FIG. 5, the system may be provided with a mechanism for sensing a first force $F_{backsensor}$ at a first location 100 of the axis of rotation and a second mechanism for measuring a second force $F_{frontsensor}$ at a second location 102 of the axis of rotation. It should be understood that both the first and second forces shown in FIG. 5 are likely to be determined from a plurality of force sensors arranged so the resultant force vectors along multiple axes of the system can be determined at each of the first and second locations, 100 and 102, of the axis of rotation.

If a washing machine or similar apparatus with a rotating member is rigidly attached to an unmovable object, such as a concrete floor, in such a manner that movement of the machine was prevented, a mere force and moment analysis based on forces and moment arms shown in FIG. 5 would be appropriate and could yield sufficient information to allow the counterbalance forces to be implemented in a manner that would achieve a balance of a rotating drum 54. As discussed above, however, in association with FIGS. 3 and 4, it is not practical to expect a machine of this type to be installed and operate without motion being experienced by the various portions of the machine. Therefore, it may be beneficial to measure motion relative to a footing or inertial space (e.g., acceleration) and account for it in the analysis of forces.

Figure 6:
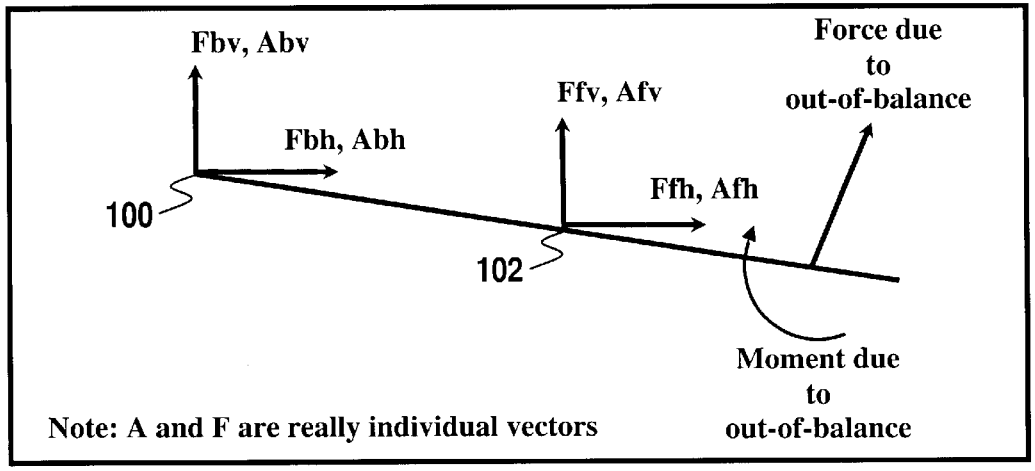
FIGS. 6 and 7 depict a graphical representation of a shaft with measured forces and accelerations.
Figure 7:
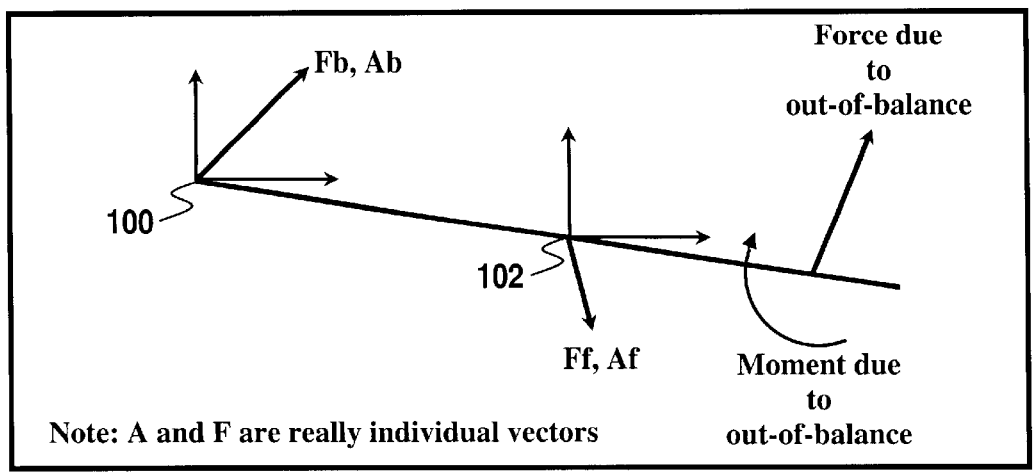

FIGS. 6 and 7 show the measurement of forces and accelerations in three-dimensional space at various locations along the shaft 52. Viewing FIGS. 6 and 7 together, it can be seen that the forces and accelerations can be measured at two coincident locations on the shaft 52. It can be appreciated, however, that this coincidence of the first force and the first acceleration or the second force and the second acceleration are not requirements of the present invention. At each of the first and second locations, 100 and 102, the effects of rotating out-of-balance forces are determined along the horizontal (h) and vertical (v) coordinates. It can be appreciated by those skilled in the art that the coordinates illustrated in FIGS. 6 and 7 represent the fact that the concepts in U.S. Pat. No. 5,561,993 and the present invention operate with information describing the forces in terms of a magnitude, a fixed direction and an associated rotating drum angle. Similarly, the motion (e.g., accelerations) may also be expressed as a magnitude along a fixed direction with an associated rotating drum angle.

TABLE I

| VARIABLE | MEANING |
|---|---|
| Inputs | |
| $\Delta m_{front\_cb}$ | test counterbalance mass placed in the front plane (vector) |
| $\Delta m_{back\_cb}$ | test counterbalance mass placed in the back plane (vector) |
| $\omega back$ | speed of rotation in (rad/sec) at which the back plane test counterbalance occurred |
| $\omega front$ | speed of rotation in (rad/sec) at which the front plane test counterbalance occurred |
| R | radius of counterbalance placement (inches) |
| $\omega$ | current speed of rotation |
| Outputs | |
| $f_{back}$ | back force sensor (lbf) (vector) |
| $f_{front}$ | front force sensor (lbf) (vector) |
| $a_{back}$ | back accelerometer sensor (in/sec$^2$) (vector) |
| $a_{front}$ | front accelerometer sensor (in/sec$^2$) (vector) |
| Actions | |
| $m_{backplane\_cb}$ | estimated backplane counterbalance to drive sensor readings to zero (vector) |
| $M_{frontplane\_cb}$ | estimated frontplane counterbalance to drive sensor readings to zero (vector) |

For the following discussion, Table I illustrates the inputs and outputs used in the multi-input/multi-output condition relating to the invention discussed in U.S. Pat. No. 5,561,993. In order to find the appropriate solutions for the counterbalance forces described above in conjunction with FIG. 4, the measured forces and accelerations should be considered in the balancing of the system forces and moments. As described above, the counterbalance masses, forces and accelerations represent magnitudes and angles. Therefore, all variables shown in Table I, except r and $\omega$, generally comprise both a magnitude and an angle in polar coordinates, which can be converted to complex coordinates. The relationship described in equation 5 above can be rewritten for the multi-input/multi-output case to result in four coupled simultaneous equations, incorporating the effects of perturbations in both front and back planes that could have occurred at rotational speeds slightly different from the current speed. These four relationships are shown below and are identified as equation 6 below.

$$a_{back4} = -\left(\frac{a_{back1} - a_{back0}}{r \cdot \omega_{back}^2 \cdot \Delta m_{back\_cb}}\right) \cdot r \cdot \omega^2 \cdot m_{backplane\_cb} - \left(\frac{a_{back3} - a_{back2}}{r \cdot \omega_{front}^2 \cdot \Delta m_{front\_cb}}\right) \cdot r \cdot \omega^2 \cdot m_{frontplane\_cb} \quad (6)$$

$$a_{front4} = -\left(\frac{a_{front1} - a_{front0}}{r \cdot \omega_{back}^2 \cdot \Delta m_{back\_cb}}\right) \cdot r \cdot \omega^2 \cdot m_{backplane\_cb} - \left(\frac{a_{back3} - a_{back2}}{r \cdot \omega_{front}^2 \cdot \Delta m_{front\_cb}}\right) \cdot r \cdot \omega^2 \cdot m_{frontplane\_cb}$$

$$f_{back4} = -\left(\frac{f_{back1} - f_{back0}}{r \cdot \omega_{back}^2 \cdot \Delta m_{back\_cb}}\right) \cdot r \cdot \omega^2 \cdot m_{backplane\_cb} - \left(\frac{f_{back3} - f_{back2}}{r \cdot \omega_{front}^2 \cdot \Delta m_{front\_cb}}\right) \cdot r \cdot \omega^2 \cdot m_{frontplane\_cb}$$

$$f_{back4} = -\left(\frac{f_{front1} - f_{front0}}{r \cdot \omega_{back}^2 \cdot \Delta m_{back\_cb}}\right) \cdot r \cdot \omega^2 \cdot m_{backplane\_cb} - \left(\frac{f_{front3} - f_{front2}}{r \cdot \omega_{front}^2 \cdot \Delta m_{front\_cb}}\right) \cdot r \cdot \omega^2 \cdot m_{frontplane\_cb}$$

The four relationships are generally grouped together as a single equation since they can be treated as a matrix in the following discussion. The meanings of the subscripts in equation 6 above are identified in Table II.

TABLE II

| SUBSCRIPT | MEANING |
|---|---|
| 0 | Measurement prior to backplane counter-balance test mass $\Delta m_{back\_cb}$ |
| 1 | measurement after backplane counter_balance test mass $\Delta m_{back\_cb}$ |
| 2 | measurement prior to frontplane counterbalance test mass $\Delta m_{front\_cb}$ |
| 3 | measurement after frontplane counterbalance test mass $\Delta m_{front\_cb}$ |
| 4 | current sensor measurement |

The relationships shown above in equation 6 can be applied to equation 5 in matrix form as:

$$\begin{bmatrix} a_{back4} \\ a_{front4} \\ f_{back4} \\ f_{front4} \end{bmatrix} = -\begin{bmatrix} \frac{a_{back1} - a_{back0}}{r \cdot \omega_{back}^2 \Delta m_{back\_cb}} & \frac{a_{back3} - a_{back2}}{r \cdot \omega_{front}^2 \Delta m_{front\_cb}} \\ \frac{a_{front1} - a_{front0}}{r \cdot \omega_{back}^2 \Delta m_{back\_cb}} & \frac{a_{front3} - a_{front2}}{r \cdot \omega_{front}^2 \Delta m_{front\_cb}} \\ \frac{f_{back1} - f_{back0}}{r \cdot \omega_{back}^2 \Delta m_{back\_cb}} & \frac{f_{back3} - f_{back2}}{r \cdot \omega_{front}^2 \Delta m_{front\_cb}} \\ \frac{f_{front1} - f_{front0}}{r \cdot \omega_{back}^2 \Delta m_{back\_cb}} & \frac{f_{front3} - f_{front2}}{r \cdot \omega_{front}^2 \Delta m_{front\_cb}} \end{bmatrix} \cdot \begin{bmatrix} m_{backplane\_cb} \\ m_{frontplane\_cb} \end{bmatrix} \cdot r \cdot \omega^2 \quad (7)$$

Where we describe this matrix equation as being in the form b=Ax and $$A = -\frac{\partial f(m)}{\partial m} = -\begin{bmatrix} \frac{a_{back1} - a_{back0}}{r \cdot \omega_{back}^2 \Delta m_{back\_cb}} & \frac{a_{back3} - a_{back2}}{r \cdot \omega_{front}^2 \Delta m_{front\_cb}} \\ \frac{a_{front1} - a_{front0}}{r \cdot \omega_{back}^2 \Delta m_{back\_cb}} & \frac{a_{front3} - a_{front2}}{r \cdot \omega_{front}^2 \Delta m_{front\_cb}} \\ \frac{f_{back1} - f_{back0}}{r \cdot \omega_{back}^2 \Delta m_{back\_cb}} & \frac{f_{back3} - f_{back2}}{r \cdot \omega_{front}^2 \Delta m_{front\_cb}} \\ \frac{f_{front1} - f_{front0}}{r \cdot \omega_{back}^2 \Delta m_{back\_cb}} & \frac{f_{front3} - f_{front2}}{r \cdot \omega_{front}^2 \Delta m_{front\_cb}} \end{bmatrix} \quad (8)$$

Equations 6, 7 and 8 depict the mathematical model that was developed and described in U.S. Pat. No. 5,561,993. This mathematical model is formulated such that the dynamics of the system are divided into two columns based on whether mass is placed in the front plane (i.e., column 2) or the back plane (i.e., column 1) of the spinner. The present invention disclosed herein may be used with this control model or like extensions, the more general solution of which allows for the placement of mass in both the front and the back plane simultaneously and covers the case where more than two inputs to the system may be utilized.

The equation relationships shown in equation 7 can be rewritten in matrix format to solve for the counterbalance masses, $m_{backplane\_cb}$ and $m_{frontplane\_cb}$, required to bring the system into balance in the same manner as described in U.S. Pat. No. 5,561,993. For the case of four sensors and using the A matrix of equation 8, this can be expressed through equation 9 as:

$$r \cdot \omega \cdot \begin{bmatrix} m_{backplane\_cb} \\ m_{frontplane\_cb} \end{bmatrix} = -A^+ \cdot \begin{bmatrix} a_{back} \\ a_{front} \\ f_{back} \\ f_{front} \end{bmatrix} \quad (9)$$

In a situation such as that described by equation 9 above, where two accelerations and two forces are known from measurements and two counterbalanced forces are unknown, there are more equations than unknowns. Each sensor provides an equation, while there are only two unknown counterbalance forces for the front and back planes of the drum. Therefore, the system is over determined and a technique is required to solve for more equations than unknowns in an optimal manner. The technique for solving equations of this type in a balancing scheme should find a solution that minimizes all of the sensor readings and also minimizes the amount of counterbalance action required to balance the rotating system or rotating device. In other words, the force sensors and the accelerometers should all be driven as close to zero as possible by the selected counterbalances, and the total amount of counterbalance actions taken should be minimized.

Those skilled in the art can appreciate that a mathematical technique, which may solve this problem, involves computation of the pseudo inverse of the A matrix ($A^+$) utilizing the singular value decomposition (SVD) technique. This solution method finds the optimal solution to the inconsistent system represented simply by equation 9. The SVD is one of several techniques that can support the pseudo-inverse calculation for control. It can provide optimal control for both inputs and outputs of the modeled system. Other variations of the components that make up the SVD may be used alone but would not provide both input and output optimization. This procedure is fully described in U.S. Pat. No. 5,561,993 and is well known to those skilled in the art and is described in significant detail in various reference linear algebra textbooks.

After generating the solution to equation 9, it may be necessary to formulate a practical approach to applying the counterbalance mass to the rotating member. Further, after the control action is applied, it may be necessary to evaluate the member to verify that the control action had the desired balancing affect. In an ideal system the force applied to the rotating portion of the member is linearly related to the force and motion that the sensors measure. In this ideal system the placement of the optimal counterbalances determined by solving the system in the manner described herein should drive all the sensors to zero and achieve perfect balance of the rotating member. For various reasons, however, it is not expected that an ideal system exists. An approach to applying counterbalance and verifying the control action effect is fully described in U.S. Pat. No. 5,561,993, which is incorporated herein by reference. Those skilled in the art can appreciate that the approaches to applying counterbalance and verifying the control action effect, which were disclosed in U.S. Pat. No. 5,561,993, do not limit the scope of the present invention. The features, techniques, methods and systems disclosed in U.S. Pat. No. 5,561,993 are described herein for illustrative and background purposes only.

Relevant to the present invention is the sensing aspect of U.S. Pat. No. 5,561,993: forces and accelerations of interest are actually rotating vectors. That is, they are fixed with respect to the rotating members of the system and rotate at the rotational speed with respect to the stationary members of the system. Thus, the desired information has a constant magnitude and angle regarding the rotating reference frame of the rotational members that is then superimposed by a periodic component regarding the stationary reference frame that supports the rotating members. In the preferred embodiment described above, sensors for obtaining this information can be attached to the stationary members, as illustrated in FIGS. 3 and 5. It is important to understand that the present invention is not limited to this particular sensor attachment. Depending on the dynamics of the system, not only could sensors be located on other parts of the stationary members, but may also be mounted on parts of the rotating members of the system.

The signals from the sensor measurements may be comprised of a sinusoidal waveform with a constant offset bias and corrupted by measurement noise as well as harmonically related system noise. The signal component of interest is the sinusoidal component at the frequency matching the speed of rotation. Known data acquisition techniques can be used to acquire the data in a digital format, including AC coupling to eliminate the constant offset bias, amplification as needed, and low pass filtering to prevent aliasing in the event the data is digitized. Additional corruption of the sensor signals can be eliminated with a narrow band pass function that is tunable in real time to the speed of rotation. The band pass function also rejects external disturbances that can occur at frequencies other than the rotating frequency. Signal conditioning should introduce insignificant or known fixed delays to the sensed data. Certain aspects of the signal conditioning can be performed with analog or digital techniques.

The band pass function can be accomplished through correlation of the sensor signal with a sinusoid referenced to the position of the rotating device. By having at least one known position of the rotating device, data can be measured and calculated with respect to that position. Measured points may be correlated by creating two summations: an X summation and a Y summation. The X summation is generally one revolution of data points multiplied by a cosine reference term with respect to the position of the rotating device. The Y summation is generally one revolution of data points multiplied by a sine reference term with respect to the position of the rotating device. For a reasonable filtered or correlated result, two or three revolutions of data are generally collected utilizing a direct memory access, and the correlation is performed on the complete data set. This approach takes a great deal of time, both in process and delay time, while waiting for the device to rotate; this time can be critical in that the balance condition is changing. Additionally, variation in rotational speed can impact correlated results, yet no check is available on the validity of the correlated result.

The present invention is thus generally an improvement to the band pass filter concepts described by U.S. Pat. No. 5,561,993. The present invention improves the method and system for implementing the correlation filter function through reduced computation time and operations, reduced time waiting for data collection due to real-time correlation, i.e., dynamic, and by providing a quality measure of the correlated result.

Figure 8:
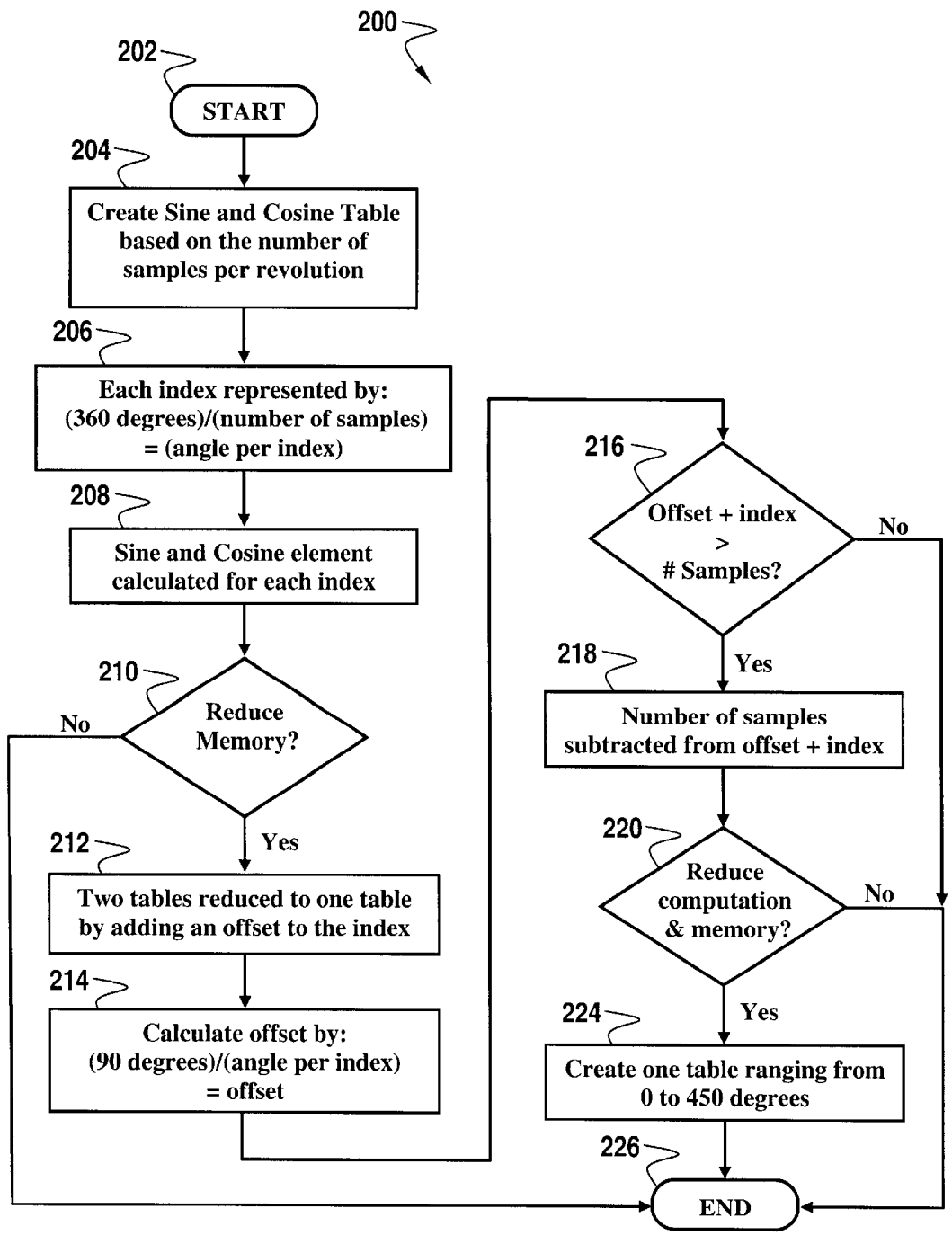
FIG. 8 illustrates a high-level flow chart of operations describing operational steps for indexing sine and cosine elements based on the number of samples per revolution, in accordance with preferred embodiments of the present invention.

FIG. 8 illustrates a high-level flow chart 200 depicting operational steps for indexing sine and cosine elements based on the number of samples per revolution, in accordance with preferred embodiments of the present invention. The process is initiated, as indicated at block 202. FIG. 8 thus depicts a first correlation method, according to the present invention, which involves the creation of sine and cosine tables based on a number of samples per revolution, as illustrated at block 204. As depicted at block 206, each index may be represented by the following formulation:

(360 degrees)/(number of samples)=(angle per index)

The sine and cosine element can be then calculated for each index, as depicted at block 208. Indexing into these tables reduces computation time but generally requires memory. If reducing memory is an important factor, as indicated at block 210 the two tables can be reduced to one table by adding an offset to the index to obtain a cosine term from a sine table, as illustrated thereafter at block 212. The two tables can be reduced to one table in this manner because a cosine of an angle is equivalent to the sine of an angle plus ninety degrees. If reduction in memory is not required, the process simply terminates, as depicted at block 226. The offset may be calculated, as described at block 214, according to the following formulation:

(90 degrees)/(angle per index)=offset

If the offset plus the index is greater than the number of samples, as illustrated at block 216, the number of samples can be subtracted from the offset plus the index, as indicated thereafter at block 218. If the offset plus the index is not greater than the number of samples, the sum is used as is and the process terminates, as depicted at block 226.

It may be necessary to reduce both computation and memory. If so, then the operation depicted at block 224 may be processed. If not, the process simply ends, as indicated at block 226. To reduce both computations and memory (one table size), one table may be created which ranges from 0 to 450 degrees, which results in only one addition for the cosine term, as illustrated at block 224. The index angle plus 90 degrees at 360 degrees is thus equivalent to 450 degrees. Following processing of the operation described at block 224, the process then ends.

Figure 9:
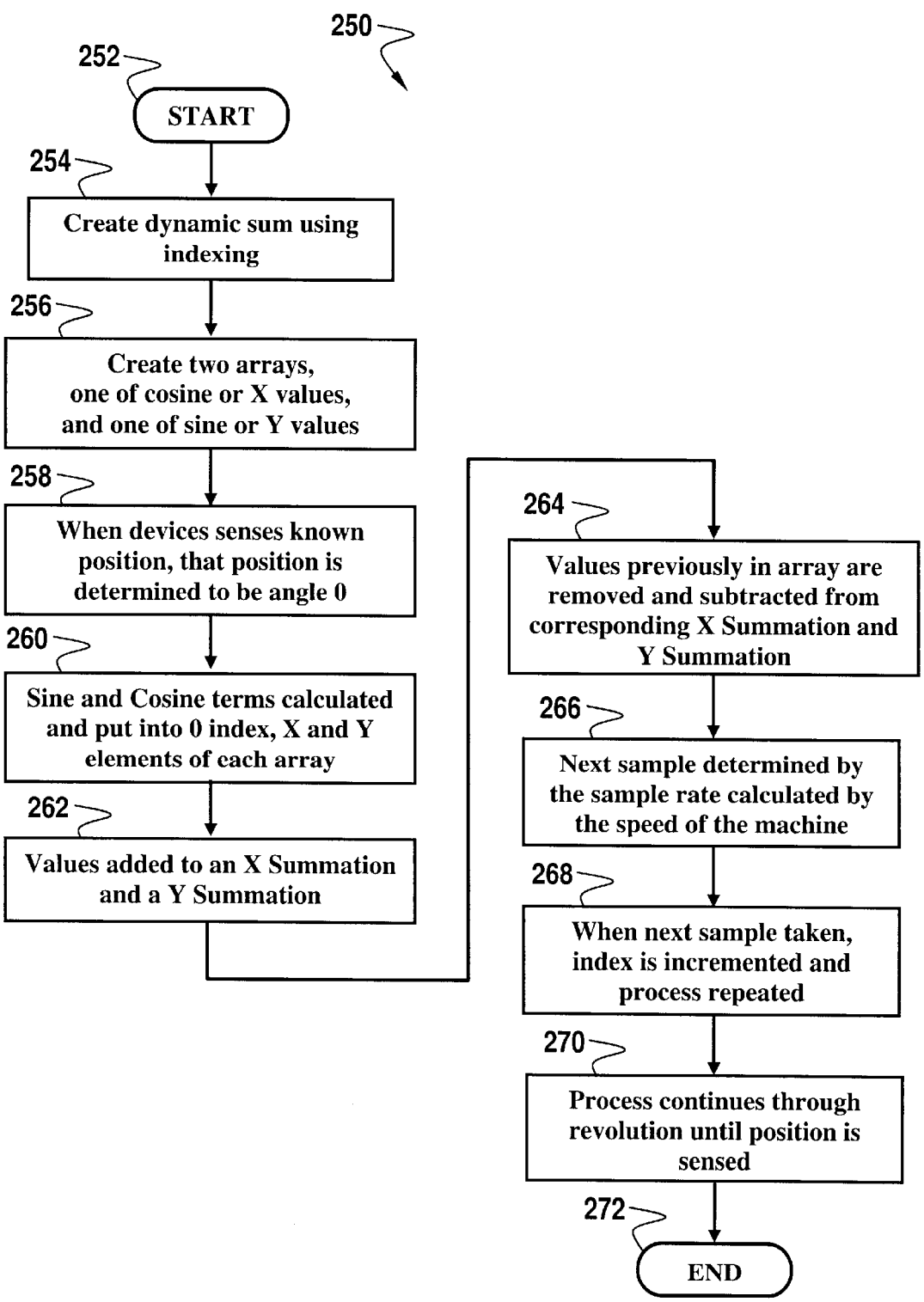
FIG. 9 depicts a high-level flow chart of operations illustrating operational steps for creating a dynamic summation utilizing indexing and arrays, in accordance with preferred embodiments of the present invention.

FIG. 9 depicts a high-level flow chart 250 illustrating operational steps for creating a dynamic, i.e., real-time, summation utilizing indexing and arrays, in accordance with preferred embodiments of the present invention. The process is initiated, as indicated at block 252. A dynamic sum is created, as indicated at block 254, utilizing the same indexing technique described herein with reference to FIG. 8. Additionally, as illustrated at block 256, two arrays can be created, one of cosine or X values, and one of sine or Y values. These arrays can be utilized in the creation of the dynamic X and Y correlation sums. When a device, such as the self-balancing rotatable apparatus described herein, senses a known position, that position is determined to be angle 0, as illustrated at block 258. If the device has more than one position sensor, this technique can also be utilized with greater accuracy.

The sine and cosine product terms may be then calculated and placed into the 0 index, X and Y elements of each array, as described at block 260. These values may be then added to an X Summation and a Y Summation, as illustrated at block 262. Values that were previously in the array may be removed and subtracted from the corresponding X Summation and Y Summation, as illustrated at block 264. Whether the new values are added first, or the old values are subtracted first, does not matter because the order does not result in a difference in the outcome. The next sample is determined by the sample rate, which is calculated by the speed of the machine, as illustrated at block 266. When the next sample is taken, the index is incremented and the process may then be repeated, as indicated at block 268. The process can continue through the revolution until the position is sensed, as depicted at block 270. The process may then terminate, as illustrated at block 272.

At any time during the process, the X Summation and the Y Summation are available and can be utilized to calculate the angle and magnitude of the sensed out of balance. The magnitude is generally the square root of the following:

(X Summation squared+Y Summation squared)

The angle may be calculated by the inverse tangent of the following:

(Y Summation/X Summation)

The result may be placed into the correct quadrant, because it is rotating 360 degrees. At least one revolution of data is always maintained within the sum. Therefore, such calculations can occur dynamically, i.e., in real-time. There is no longer the need to wait for revolutions of data to be collected.

Figure 10:
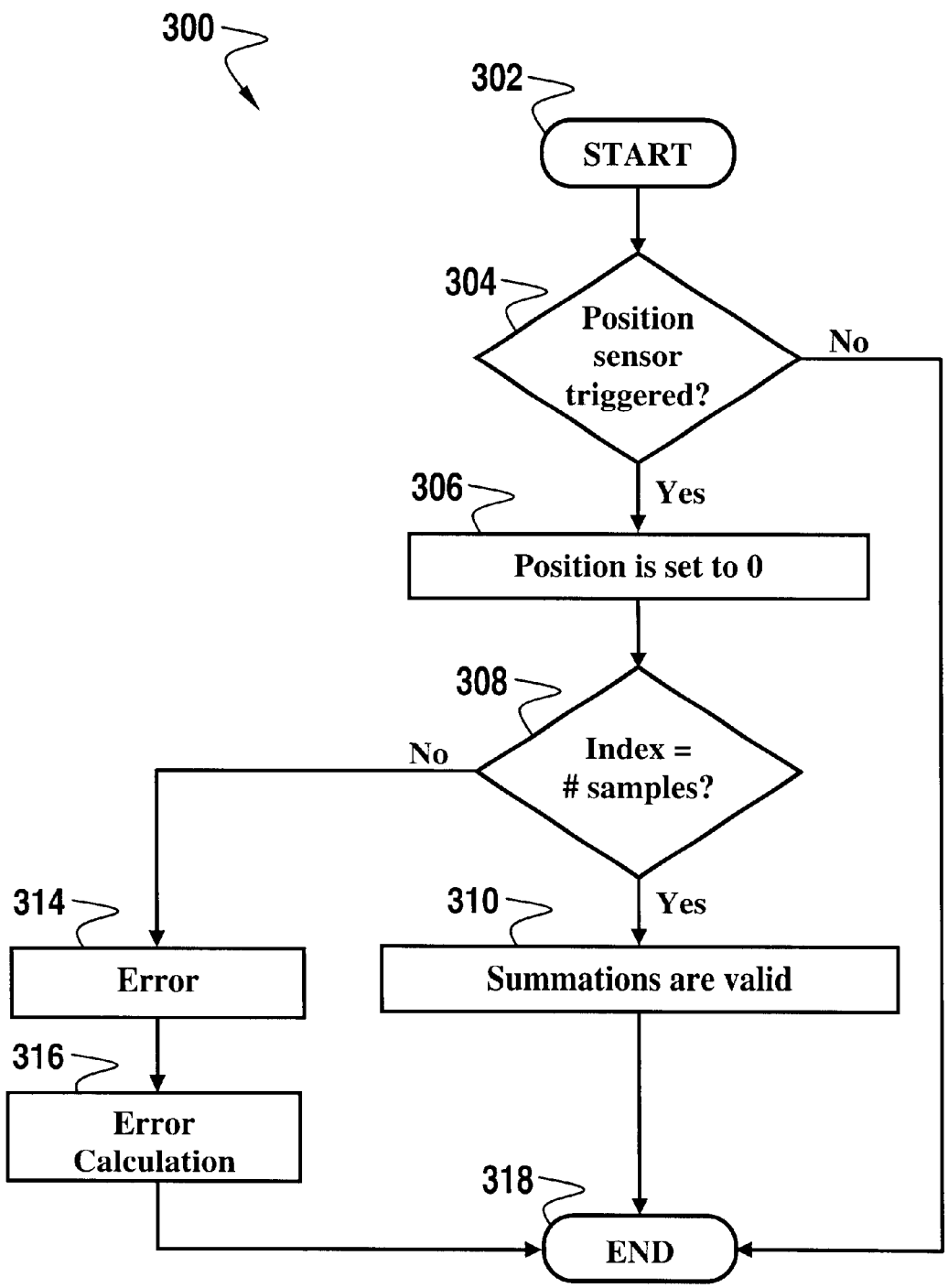
FIG. 10 illustrates a high-level flow chart of operations illustrating operational steps for determining the accuracy of measurements, in accordance with preferred embodiments of the present invention.

FIG. 10 depicts a high-level flow chart 300 illustrating operational steps for determining the accuracy of measurements, in accordance with preferred embodiments of the present invention. The process may be initiated, as depicted at block 302. As indicated at block 304, a determination is made whether or not the position sensor has been triggered. If the position sensor has not been triggered, then the process can simply terminate, as indicated at block 318.

If the position sensor is triggered, then, as illustrated at block 306, the position by design may now be set to 0. Thereafter, as described at block 308, a test may be performed to determine if the index is equal to the number of samples. If so, then, as illustrated thereafter at block 310, the summations are valid. The process can then terminate, as illustrated at block 318, following completion of the operation depicted at block 310. If the index does not equal the number of samples, then an error may be present, as indicated at block 314. The error may be due to the fact that the machine (i.e., a self-balancing rotatable apparatus) generally changes speed during the revolution. The error may be calculated, as depicted at block 316 based on the following general formulation:

(number of samples−index)/number of samples

The process may then terminate, as illustrated at block 318.

Those skilled in the art can appreciate, based on the foregoing, that variations to the methods and systems presented herein may be performed, while still falling within the scope of the present invention. If the error calculation is small, for example, the X and Y summations may be utilized to calculate magnitude and angle of the filtered sensor signal. To obtain an accurate summation, the old summation may be discarded and the system can wait another revolution. Another technique for obtaining accurate summations is to use the X and Y values, index through the array, multiply each value by an error factor for scaling, and compute the X and Y summations.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

What is claimed is:

1. A method for extracting data associated with the dynamics of a rotating system, wherein said rotating system contains sensors therein, said method comprising the steps of:

compiling sensor measurement data from said sensors, wherein said sensor measurement data contain data indicative of the dynamics of said rotating system;

creating a sine table and a cosine table based on a particular number of measured data points per revolution of said rotating system;

formulating an index into said sine table and said cosine table that is time synchronized with said sensor measurement data and referenced to an angular position of said rotating system; and dynamically correlating said sensor measurement data with data contained within said sine table and said cosine table to obtain data associated with a balance condition of said rotating system, such that said dynamically correlated data is thereafter available on demand and utilized to determine a required correction necessary to place said rotating system in a balanced state.

2. The method of claim 1 further comprising the step of:

computing a validity of said data based on a percentage of calculated error, wherein said data may be subsequently accepted or rejected depending on a particular need for accuracy of said data to thereby permit a correlation quality to be assessed.

3. The method of claim 1 further comprising the steps of:

combining said sine table and said cosine table into a combined sine and cosine table to thereby reduce memory required to retain said data contained within said sine table and said cosine table;

formulating an index associated with said combined sine and cosine table, wherein said index is formulated based on an angular position of said rotating system at the time said sensor measurement data is compiled, thereby adjusting formulation of said index by 90 degrees to distinguish sine data versus cosine data; and calculating at least one correlation product term of said sensor measurement data with said sine element and said cosine element respectively for said index, wherein said index is associated with said combined sine and cosine table, thereby permitting a reduction in computation time and a reduction in a particular number of operations required to dynamically correlate said sensor measurement data with data contained in said combined sine and cosine table.

4. The method of claim 3 further comprising the steps of:

compiling a first array and a second array wherein said first array comprises X values and said second array comprises Y values;

wherein said X values comprise correlation product terms for sensor measurement data and cosine table data;

wherein said Y values comprise correlation product terms for sensor measurement data and sine table data, such that said arrays represent a moving window of at least one multiple of rotational periods kept current to a most recent sensor measurement data;

respectively adding said X values and said Y values to an X summation and a Y summation; and calculating an angle and magnitude associated with a sensed out of balance of said rotating system utilizing said X summation and said Y summation, such that a calculation of said angle and said magnitude occurs in real time.

5. The method of claim 1 wherein said rotating system comprises a washing appliance.

6. A method for extracting data associated with the dynamics of a rotating system, wherein said rotating system contains sensors therein, said method comprising the steps of:

compiling sensor measurement data from said sensors, wherein said sensor measurement data contain data indicative of the dynamics of said rotating system;

creating a sine table and a cosine table based on a particular number of measured data points per revolution of said rotating system;

formulating an index into said sine table and said cosine table that is time synchronized with said sensor measurement data and referenced to an angular position of said rotating system;

dynamically correlating said sensor measurement data with data contained within said sine table and said cosine table to obtain data associated with a balance condition of said rotating system, such that said dynamically correlated data is thereafter available on demand and utilized to determine a required correction necessary to place said rotating system in a balanced state; and computing a validity of said data based on a percentage of calculated error, wherein said data may be subsequently accepted or rejected depending on a particular need for accuracy of said data to thereby permit a correlation quality to be assessed.

7. A method for extracting data associated with the dynamics of a rotating system containing sensors therein for compiling sensor measurement data indicative of the dynamics of said rotating system, said method comprising the steps of:

creating a sine table and a cosine table based on a particular number of measured data points per revolution of said rotating system;

formulating an index into said sine table and said cosine table that is time synchronized with said sensor measurement data and referenced to an angular position of said rotating system;

dynamically correlating said sensor measurement data with data contained within said sine table and said cosine table to obtain data associated with a balance condition of said rotating system, such that said dynamically correlated data is thereafter available on demand and utilized to determine a required correction necessary to place said rotating system in a balanced state; and computing a validity of said data based on a percentage of calculated error, wherein said data may be subsequently accepted or rejected depending on a particular need for accuracy of said data to thereby permit a correlation quality to be assessed.

8. A system for extracting data associated with the dynamics of a rotating device, wherein said rotating device contains sensors therein, said system comprising:

sensor measurement data compiled from said sensors, wherein said sensor measurement data contain data indicative of the dynamics of said rotating device;

a sine table and a cosine table based on a particular number of measured data points per revolution of said rotating device;

an index formulated into said sine table and said cosine table that is time synchronized with said sensor measurement data and referenced to an angular position of said rotating device; and said sensor measurement data dynamically correlated with data contained within said sine table and said cosine table to obtain data associated with a balance condition of said rotating device, such that said dynamically correlated data is thereafter available on demand and utilized to determine a required correction necessary to place said rotating device in a balanced state.

9. The system of claim 8 further comprising:

a validity of said data computed based on a percentage of calculated error, wherein said data may be subsequently accepted or rejected depending on a particular need for accuracy of said data to thereby permit a correlation quality to be assessed.

10. The system of claim 8 further comprising:

said sine table and said cosine table merged into a combined sine and cosine table to thereby reduce memory required to retain said data contained within said sine table and said cosine table;

an index associated with said combined sine and cosine table, wherein said index is formulated based on an angular position of said rotating device at the time said sensor measurement data is compiled, thereby adjusting formulation of said index by 90 degrees to distinguish sine data versus cosine data; and at least one correlation product term calculated for said sensor measurement data with said sine element and said cosine element respectively for said index, wherein said index is associated with said combined sine and cosine table, thereby permitting a reduction in computation time and a reduction in a particular number of operations required to dynamically correlate said sensor measurement data with data contained in said combined sine and cosine table.

11. The system of claim 10 further comprising:

a first array and a second array wherein said first array comprises X values and said second array comprises Y values;

wherein said X values comprise correlation product terms for sensor measurement data and cosine table data;

wherein said Y values comprise correlation product terms for sensor measurement data and sine table data, such that said arrays represent a moving window of at least one multiple of rotational periods kept current to a most recent sensor measurement data;

said X values and said Y values respectively added to an X summation and a Y summation; and an angle and a magnitude associated with a sensed out of balance of said rotating device, wherein said angle and said magnitude are calculated utilizing said X summation and said Y summation, such that a calculation of said angle and said magnitude occurs in real time.

12. The system of claim 8 wherein said rotating device comprises a washing appliance.

13. A system for extracting data associated with the dynamics of a rotating device, wherein said rotating device contains sensors therein, said system comprising:

sensor measurement data compiled from said sensors, wherein said sensor measurement data contain data indicative of the dynamics of said rotating device;

a sine table and a cosine table based on a particular number of measured data points per revolution of said rotating device;

an index formulated into said sine table and said cosine table that is time synchronized with said sensor measurement data and referenced to an angular position of said rotating device;

said sensor measurement data dynamically correlated with data contained within said sine table and said cosine table to obtain data associated with a balance condition of said rotating device, such that said dynamically correlated data is thereafter available on demand and utilized to determine a required correction necessary to place said rotating device in a balanced state; and a validity of said data computed based on a percentage of calculated error, wherein said data may be subsequently accepted or rejected depending on a particular need for accuracy of said data to thereby permit a correlation quality to be assessed.

14. A system for extracting data associated with the dynamics of a rotating device containing sensors therein for compiling sensor measurement data indicative of the dynamics of said rotating device, said system comprising:

a sine table and a cosine table each based on a particular number of measured data points per revolution of said rotating device;

an index formulated into said sine table and said cosine table that is time synchronized with said sensor measurement data and referenced to an angular position of said rotating device;

said sensor measurement data dynamically correlated with data contained within said sine table and said cosine table to obtain data associated with a balance condition of said rotating device, such that said dynamically correlated data is thereafter available on demand and utilized to determine a required correction necessary to place said rotating device in a balanced state; and a validity of said data computed based on a percentage of calculated error, wherein said data may be subsequently accepted or rejected depending on a particular need for accuracy of said data to thereby permit a correlation quality to be assessed.

15. A system for extracting data associated with the dynamics of a rotating device, wherein said rotating device contains sensors therein, said system comprising:

sensor measurement data compiled from said sensors, wherein said sensor measurement data contain data indicative of the dynamics of said rotating device;

a sine table and a cosine table based on a particular number of measured data points per revolution of said rotating device;

an index formulated into said sine table and said cosine table that is time synchronized with said sensor measurement data and referenced to an angular position of said rotating device;

said sensor measurement data dynamically correlated with data contained within said sine table and said cosine table to obtain data associated with a balance condition of said rotating device, such that said dynamically correlated data is thereafter available on demand and utilized to determine a required correction necessary to place said rotating device in a balanced state; and a validity of said data computed based on a percentage of calculated error, wherein said data may be subsequently accepted or rejected depending on a particular need for accuracy of said data to thereby permit a correlation quality to be assessed.

16. A system for extracting data associated with the dynamics of a rotating device, wherein said rotating device contains sensors therein, said system comprising:

sensor measurement data compiled from said sensors, wherein said sensor measurement data contain data indicative of the dynamics of said rotating device;

a sine table and a cosine table based on a particular number of measured data points per revolution of said rotating device;

an index formulated into said sine table and said cosine table that is time synchronized with said sensor measurement data and referenced to an angular position of said rotating device;

said sensor measurement data dynamically correlated with data contained within said sine table and said cosine table to obtain data associated with a balance condition of said rotating device, such that said dynamically correlated data is thereafter available on demand and utilized to determine a required correction necessary to place said rotating device in a balanced state;

said sine table and said cosine table merged into a combined sine and cosine table to thereby reduce memory required to retain said data contained within said sine table and said cosine table;

an index associated with said combined sine and cosine table, wherein said index is formulated based on an angular position of said rotating device at the time said sensor measurement data is compiled, thereby adjusting formulation of said index by 90 degrees to distinguish sine data versus cosine data; and at least one correlation product term calculated for said sensor measurement data with said sine element and said cosine element respectively for said index, wherein said index is associated with said combined sine and cosine table, thereby permitting a reduction in computation time and a reduction in a particular number of operations required to dynamically correlate said sensor measurement data with data contained in said combined sine and cosine table.

17. A system for extracting data associated with the dynamics of a rotating device, wherein said rotating device contains sensors therein, said system comprising:

sensor measurement data compiled from said sensors, wherein said sensor measurement data contain data indicative of the dynamics of said rotating device;

a sine table and a cosine table based on a particular number of measured data points per revolution of said rotating device;

an index formulated into said sine table and said cosine table that is time synchronized with said sensor measurement data and referenced to an angular position of said rotating device;

said sensor measurement data dynamically correlated with data contained within said sine table and said cosine table to obtain data associated with a balance condition of said rotating device, such that said dynamically correlated data is thereafter available on demand and utilized to determine a required correction necessary to place said rotating device in a balanced state;

said sine table and said cosine table merged into a combined sine and cosine table to thereby reduce memory required to retain said data contained within said sine table and said cosine table;

an index associated with said combined sine and cosine table, wherein said index is formulated based on an angular position of said rotating device at the time said sensor measurement data is compiled, thereby adjusting formulation of said index by 90 degrees to distinguish sine data versus cosine data;

at least one correlation product term calculated for said sensor measurement data with said sine element and said cosine element respectively for said index, wherein said index is associated with said combined sine and cosine table, thereby permitting a reduction in computation time and a reduction in a particular number of operations required to dynamically correlate said sensor measurement data with data contained in said combined sine and cosine table;

a first array and a second array wherein said first array comprises X values and said second array comprises Y values;

wherein said X values comprise correlation product terms for sensor measurement data and cosine table data;

wherein said Y values comprise correlation product terms for sensor measurement data and sine table data, such that said arrays represent a moving window of at least one multiple of rotational periods kept current to a most recent sensor measurement data;

said X values and said Y values respectively added to an X summation and a Y summation; and an angle and a magnitude associated with a sensed out of balance of said rotating device, wherein said angle and said magnitude are calculated utilizing said X summation and said Y summation, such that a calculation of said angle and said magnitude occurs in real time.

* * * * *